United States Patent
Lumbatis et al.

(10) Patent No.: US 11,553,333 B2
(45) Date of Patent: *Jan. 10, 2023

(54) METHOD OF REPORTING RECEIVED SIGNAL STRENGTH ON PER FRAME BASIS IN WI-FI NETWORK

(71) Applicant: ARRIS Enterprises LLC, Suwanee, GA (US)

(72) Inventors: Kurt Alan Lumbatis, Dacula, GA (US); Mark Hamilton, Superior, CO (US)

(73) Assignee: ARRIS ENTERPRISES LLC, Suwanee, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/341,903

(22) Filed: Jun. 8, 2021

(65) Prior Publication Data

US 2021/0385046 A1 Dec. 9, 2021

Related U.S. Application Data

(60) Provisional application No. 63/036,230, filed on Jun. 8, 2020, provisional application No. 63/059,637, filed on Jul. 31, 2020.

(51) Int. Cl.
| | | |
|---|---|---|
| *H04L 5/00* | (2006.01) | |
| *H04W 8/24* | (2009.01) | |
| *H04L 1/00* | (2006.01) | |
| *H04L 1/16* | (2006.01) | |
| *H04W 24/10* | (2009.01) | |
| *H04B 17/336* | (2015.01) | |
| *H04W 76/10* | (2018.01) | |

(Continued)

(52) U.S. Cl.
CPC ............ *H04W 8/24* (2013.01); *H04B 17/336* (2015.01); *H04L 1/0008* (2013.01); *H04L 1/1607* (2013.01); *H04L 5/0044* (2013.01); *H04L 5/0055* (2013.01); *H04L 69/22* (2013.01); *H04W 24/10* (2013.01); *H04W 76/10* (2018.02); *H04W 84/12* (2013.01)

(58) Field of Classification Search
CPC ....... H04W 8/24; H04W 24/10; H04W 76/10; H04W 84/12; H04L 1/0008; H04L 5/0044; H04L 5/0055; H04L 69/22; H04B 17/336

See application file for complete search history.

(56) References Cited

U.S. PATENT DOCUMENTS

2006/0268886 A1* 11/2006 Sammour ............ H04W 28/18
                                                                    370/394
2018/0035426 A1*  2/2018 Barriac ................ H04L 1/0007
2018/0302825 A1* 10/2018 Trainin ................ H04L 1/1867

OTHER PUBLICATIONS

International Search Report dated Sep. 10, 2021 in International (PCT) Application No. PCT/US2021/036371.

* cited by examiner

*Primary Examiner* — Brian P Cox
(74) *Attorney, Agent, or Firm* — Wenderoth, Lind & Ponack, L.L.P.

(57) ABSTRACT

Aspects of the present disclosure are drawn to a client device for use with an access point device. The client device includes: a memory; and a processor configured to execute instructions stored on the memory to cause the client device to: obtain a value associated with a capability of the client device, create a response including a header and a payload, the header including a reserved field including a bit report- (Continued)

ing that the payload of the response includes the value associated with the capability, and transmit the response to the APD.

27 Claims, 5 Drawing Sheets

(51) Int. Cl.
*H04L 69/22* (2022.01)
*H04W 84/12* (2009.01)

METHOD OF REPORTING RECEIVED SIGNAL STRENGTH ON PER FRAME BASIS IN WI-FI NETWORK

BACKGROUND

Embodiments of the present disclosure generally relate to communicating aspects of a client device to a network device in a wireless network.

SUMMARY

Aspects of the present disclosure are drawn to a client device for use with an access point device (APD). The client device includes: a memory; and a processor configured to execute instructions stored on the memory to cause the client device to: obtain a value associated with a capability of the client device, create a response including a header and a payload, the header including a reserved field including a bit reporting that the payload of the response includes the value associated with the capability, and transmit the response to the APD.

In some embodiments, the processor is further configured to execute instructions stored on the memory to additionally cause the client device to: receive an Add Block Ack (ADDBA) request frame from the APD as a Wi-Fi APD to establish a Block Ack session, the ADDBA request frame having a reserved field within an ADDBA capabilities field, the reserved field having stored therein data indicating that the Wi-Fi APD supports the capability; determine the capability of the client device based on the ADDBA request frame; create an ADDBA response including a ADDBA response header including a ADDBA response reserved field having stored therein data indicating that the client device supports the capability; and transmit the ADDBA response to the APD.

In some embodiments, the processor is further configured to execute instructions stored on the memory to additionally cause the client device to: receive data frames from the Wi-Fi APD in response to the transmission of the ADDBA response, wherein the value is additionally associated with at least one of the receipt of the ADDBA request frame and the receipt of the data frames, wherein the created response includes a Block Ack frame having Block Ack header as the header and having a Block Ack payload as the payload, and wherein the value associated with the capability resides in a BA information field of the Block Ack payload.

In some embodiments, the capability is a received channel power reporting capability, and the processor is further configured to execute instructions stored on the memory to cause the client device to: obtain, as the value, a received channel power indicator, indicative of radio frequency power received on a channel by the client device, and add the received channel power indicator as the value into the BA information field of the Block Ack payload.

In some embodiments, the capability is a received signal to noise reporting capability, and the processor is further configured to execute instructions stored on the memory to cause the client device to: obtain, as the value, a received signal-to-noise indicator, indicative of noise received on a channel by the client device, and add the received signal-to-noise indicator as the value into the BA information field of the Block Ack payload.

In some embodiments, the processor is configured to execute instructions stored on the memory to cause the client device to: determine that the client device includes plural capabilities, obtain values associated with each of the capabilities, respectively, and create the Block Ack frame such that the reserved field includes a respective bit corresponding to each of the plural capabilities, each respective bit reporting that the payload of the Block Ack frame includes the respective value associated with the respective capability, and such values associated with each of the capabilities resides in the BA information field of the Block Ack frame.

In some embodiments, the capabilities are a received channel power reporting capability and a received signal-to-noise reporting capability, and the processor is further configured to execute instructions stored on the memory to cause the client device to: obtain, as the values, a received channel power indicator, indicative of radio frequency power received on a channel by the client device, and a received signal-to-noise indicator, indicative of noise received on a channel by the client device, and add the received channel power indicator and the received signal-to-noise indicator as the values into the BA information field of the Block Ack payload.

Other aspects of the present disclosure are drawn to a method of using a client device with an APD. The method includes: obtaining, via a processor configured to execute instructions stored on a memory, a value associated with a capability of the client device, receiving, via the processor, the ADDBA request frame, creating, via the processor, a response including a header and a payload, the header including a reserved field including a bit reporting that the payload of the response includes the value associated with the capability, and transmitting, via the processor, the response to the APD.

In some embodiments, the method further includes: receiving, via the processor, an ADDBA request frame from the APD as a Wi-Fi APD to establish a Block Ack session, the ADDBA request frame having a reserved field within an ADDBA capabilities field, the reserved field having stored therein data indicating that the Wi-Fi APD supports the capability, and determining, via the processor, the capability of the client device based on the ADDBA request frame, creating, via the processor, an ADDBA response including a ADDBA response header including a ADDBA response reserved field having stored therein data indicating that the client device supports the capability, and transmitting, via the processor, the ADDBA response to the APD.

In some embodiments, the method further includes: receiving, via the processor, data frames from the Wi-Fi APD in response to the transmission of the ADDBA response, wherein the value is additionally associated with at least one of the receipt of the ADDBA request frame and the receipt of the data frames, wherein the created response includes a Block Ack frame having Block Ack header as the header and having a Block Ack payload as the payload, and wherein the value associated with the capability resides in a BA information field of the Block Ack payload.

In some embodiments, wherein the capability is a received channel power reporting capability, the method further includes: obtaining, via the processor and as the value, a received channel power indicator, indicative of radio frequency power received on a channel by the client device, and adding, via the processor, the received channel power indicator as the value into the BA information field of the Block Ack payload.

In some embodiments, wherein the capability is a received signal-to-noise reporting capability, the method further includes: obtaining, via the processor and as the value, a received signal-to-noise indicator, indicative of noise received on a channel by the client device, and adding, via the processor, the received signal-to-noise indicator as the value into the BA information field of the Block Ack payload.

In some embodiments, the method further includes: determining, via the processor, that the client device includes plural capabilities; obtaining, via the processor, values associated with each of the capabilities, respectively; and creating, via the processor, the Block Ack frame such that the reserved field includes a respective bit corresponding to each of the plural capabilities, each respective bit reporting that the payload of the Block Ack frame includes the respective value associated with the respective capability, and such values associated with each of the capabilities resides in the BA information field of the Block Ack frame.

In some embodiments, wherein the capabilities are a received channel power reporting capability and a received signal-to-noise reporting capability, the method further includes: obtaining, via the processor and as the values, a received channel power indicator, indicative of radio frequency power received on a channel by the client device, and a received signal-to-noise indicator, indicative of noise received on a channel by the client device, and adding, via the processor, the received channel power indicator and the received signal-to-noise indicator as the values into the BA information field of the Block Ack payload.

Other aspects of the disclosure are drawn to a non-transitory, computer-readable media having computer-readable instructions stored thereon, the computer-readable instructions being capable of being read by a client device for use with an APD, wherein the computer-readable instructions are capable of instructing the client device to perform the method including: obtaining, via a processor configured to execute instructions stored on a memory, a value associated with a capability of the client device, receiving, via the processor, the ADDBA request frame, creating, via the processor, a response including a header and a payload, the header including a reserved field including a bit reporting that the payload of the response includes the value associated with the capability, and transmitting, via the processor, the response to the APD.

In some embodiments, the computer-readable instructions are capable of instructing the client device to perform the method further including: receiving, via the processor, an ADDBA request frame from the APD as a Wi-Fi APD to establish a Block Ack session, the ADDBA request frame having a reserved field within an ADDBA capabilities field, the reserved field having stored therein data indicating that the Wi-Fi APD supports the capability, and determining, via the processor, the capability of the client device based on the ADDBA request frame, creating, via the processor, an ADDBA response including a ADDBA response header including a ADDBA response reserved field having stored therein data indicating that the client device supports the capability, and transmitting, via the processor, the ADDBA response to the APD.

In some embodiments, the computer-readable instructions are capable of instructing the client device to perform the method further including: receiving, via the processor, data frames from the Wi-Fi APD in response to the transmission of the ADDBA response, wherein the value is additionally associated with at least one of the receipt of the ADDBA request frame and the receipt of the data frames, wherein the created response includes a Block Ack frame having Block Ack header as the header and having a Block Ack payload as the payload, and wherein the value associated with the capability resides in a BA information field of the Block Ack payload.

In some embodiments, the computer-readable instructions are capable of instructing the client device to perform the method wherein the capability is a received channel power reporting capability, and wherein the method further includes: obtaining, via the processor and as the value, a received channel power indicator, indicative of radio frequency power received on a channel by the client device, and adding, via the processor, the received channel power indicator as the value into the BA information field of the Block Ack payload.

In some embodiments, the computer-readable instructions are capable of instructing the client device to perform the method wherein the capability is a received signal-to-noise reporting capability, and wherein the method further includes: obtaining, via the processor and as the value, a received signal-to-noise indicator, indicative of noise received on a channel by the client device, and adding, via the processor, the received signal-to-noise indicator as the value into the BA information field of the Block Ack payload.

In some embodiments, the computer-readable instructions are capable of instructing the client device to perform the method further including: determining, via the processor, that the client device includes plural capabilities; obtaining, via the processor, values associated with each of the capabilities, respectively; and creating, via the processor, the Block Ack frame such that the reserved field includes a respective bit corresponding to each of the plural capabilities, each respective bit reporting that the payload of the Block Ack frame includes the respective value associated with the respective capability, and such values associated with each of the capabilities resides in the BA information field of the Block Ack frame.

In some embodiments, the computer-readable instructions are capable of instructing the client device to perform the method wherein the capabilities are a received channel power reporting capability and a received signal-to-noise reporting capability, and wherein the method further includes: obtaining, via the processor and as the values, a received channel power indicator, indicative of radio frequency power received on a channel by the client device, and a received signal-to-noise indicator, indicative of noise received on a channel by the client device, and adding, via the processor, the received channel power indicator and the received signal-to-noise indicator as the values into the BA information field of the Block Ack payload.

Other aspects of the disclosure are drawn to an APD for use with a client device, the APD including: a memory; and a processor configured to execute instructions stored on the memory to cause the APD to: create a request including an extension element including a reserved field including a bit identifying a capability supported by the APD, and transmit the request to the client device.

In some embodiments, the processor is further configured to execute instructions stored on the memory to additionally cause the APD to: create the request as a ADDBA request frame to establish a Block Ack session, the reserved field being within an ADDBA capabilities field; and receive, from the client device, a Block Ack frame having Block Ack header and a Block Ack payload, wherein a value associated with a capability of the client device resides in a BA information field of the Block Ack payload.

In some embodiments, the capability is a received channel power reporting capability, and the processor is further configured to execute instructions stored on the memory to cause the APD to obtain, as the value and from the BA information field of the Block Ack payload, a received channel power indicator, indicative of radio frequency power received on a channel by the client device.

In some embodiments, the capability is a received signal to noise reporting capability, and the processor is further configured to execute instructions stored on the memory to cause the APD to obtain, as the value and from the BA information field of the Block Ack payload, a received signal-to-noise indicator, indicative of noise received on a channel by the client device.

In some embodiments, the processor is configured to execute instructions stored on the memory to cause the APD to: create the request to include the extension element to include the reserved field to include a plurality bits, each identifying a respective capability supported by the APD, wherein plural values associated with plural capabilities, respectively, of the client device reside in the BA information field of the Block Ack payload.

In some embodiments, the capabilities are a received channel power reporting capability and a received signal-to-noise reporting capability, and the processor is further configured to execute instructions stored on the memory to cause the APD to: obtain, as the values, a received channel power indicator, indicative of radio frequency power received on a channel by the client device, and a received signal-to-noise indicator, indicative of noise received on a channel by the client device, and add the received channel power indicator and the received signal-to-noise indicator as the values into the BA information field of the Block Ack payload.

Other aspects of the disclosure are drawn to a method of using an APD with a client device, the method including: creating, via a processor configured to execute instructions stored on a memory, a request including an extension element including a reserved field including a bit identifying a capability supported by the APD, and transmitting, via the processor, the request to the client device.

In some embodiments, the method further includes: creating, via the processor, the request as a ADDBA request frame to establish a Block Ack session, the reserved field being within an ADDBA capabilities field, and receiving, from the client device, a Block Ack frame having Block Ack header and a Block Ack payload, wherein a value associated with a capability of the client device resides in a BA information field of the Block Ack payload.

In some embodiments, wherein the capability is a received channel power reporting capability, the method further includes: obtaining, via the processor, as the value and from the BA information field of the Block Ack payload, a received channel power indicator, indicative of radio frequency power received on a channel by the client device.

In some embodiments, wherein the capability is a received signal-to-noise reporting capability, the method further includes: obtaining, via the processor, as the value and from the BA information field of the Block Ack payload, a received signal-to-noise indicator, indicative of noise received on a channel by the client device.

In some embodiments, the method further includes: creating the request to include the extension element to include the reserved field to include a plurality bits, each identifying a respective capability supported by the APD, wherein plural values associated with plural capabilities, respectively, of the client device reside in the BA information field of the Block Ack payload.

In some embodiments, wherein the capabilities are a received channel power reporting capability and a received signal-to-noise reporting capability, the method further includes: obtaining, via the processor and as the values, a received channel power indicator, indicative of radio frequency power received on a channel by the client device, and a received signal-to-noise indicator, indicative of noise received on a channel by the client device, and adding, via the processor, the received channel power indicator and the received signal-to-noise indicator as the values into the BA information field of the Block Ack payload.

Other aspects of the present disclosure are drawn to a non-transitory, computer-readable media having computer-readable instructions stored thereon, the computer-readable instructions being capable of being read by an APD for use with a client device, wherein the computer-readable instructions are capable of instructing the APD to perform the method including: creating, via a processor configured to execute instructions stored on a memory, a request including an extension element including a reserved field including a bit identifying a capability supported by the APD, and transmitting, via the processor, the request to the client device.

In some embodiments, the computer-readable instructions are capable of instructing the APD to perform the method further including: creating, via the processor, the request as a ADDBA request frame to establish a Block Ack session, the reserved field being within an ADDBA capabilities field, and receiving, from the client device, a Block Ack frame having Block Ack header and a Block Ack payload, wherein a value associated with a capability of the client device resides in a BA information field of the Block Ack payload.

In some embodiments, the computer-readable instructions are capable of instructing the APD to perform the method wherein the capability is a received channel power reporting capability, and wherein the method further includes: obtaining, via the processor, as the value and from the BA information field of the Block Ack payload, a received channel power indicator, indicative of radio frequency power received on a channel by the client device.

In some embodiments, the computer-readable instructions are capable of instructing the APD to perform the method wherein the capability is a received signal-to-noise reporting capability, and wherein the method further includes: obtaining, via the processor, as the value and from the BA information field of the Block Ack payload, a received signal-to-noise indicator, indicative of noise received on a channel by the client device.

In some embodiments, the computer-readable instructions are capable of instructing the APD to perform the method further including: create the request to include the extension element to include the reserved field to include a plurality bits, each identifying a respective capability supported by the APD, wherein plural values associated with plural capabilities, respectively, of the client device reside in the BA information field of the Block Ack payload.

In some embodiments, the computer-readable instructions are capable of instructing the APD to perform the method wherein the capabilities are a received channel power reporting capability and a received signal-to-noise reporting capability, and wherein the method further includes: obtaining, via the processor and as the values, a received channel power indicator, indicative of radio frequency power received on a channel by the APD, and a received signal-to-noise indicator, indicative of noise received on a channel by the APD, and adding, via the processor, the received channel power indicator and the received signal-to-noise indicator as the values into the BA information field of the Block Ack payload.

BRIEF SUMMARY OF THE DRAWINGS

The accompanying drawings, which are incorporated in and form a part of the specification, illustrate example embodiments and, together with the description, serve to explain the principles of the present disclosure. In the drawings.

DETAILED DESCRIPTION

Wireless network communications methods such as Wi-Fi are commonly used to allow client devices such as computers and smartphones to connect to other computing resources. A simple Wi-Fi network consists of an APD connected to a client device over a wireless channel.

Channel conditions such as signal strength and channel noise can vary over time. In one example, the client device may be moving away from the APD, thus reducing signal strength. In another example, a home electrical appliance may be switched on, thus increasing radio frequency noise and interference.

Conventional methods exist for the client device to report channel conditions to the APD. A limitation of these conventional methods is that they rely on explicit command and response frames between the APD and the client device. These command and response frames can interrupt the transmission of data frames, and therefore add overhead. What is needed is a system and method of efficiently reporting channel conditions by the client device to the APD.

A system and method in accordance with the present disclosure enables efficient reporting of channel conditions between an APD and a client device over a wireless channel.

In accordance with the present disclosure, an APD determines whether a client device has the capability to measure and report channel conditions. The client device measures channel conditions while receiving data frames. The client device then inserts these measurement values into Block Acknowledgement (Block Ack) frames that are transmitted back to the APD. Because Block Ack frames are already used in the process of block data transfers, the additional overhead to report channel conditions is low.

An example system and method for efficiently reporting channel conditions between an APD and a client device over a wireless channel in accordance with aspects of the present disclosure will now be described in greater detail with reference to FIGS. 1-6.

Figure 1:
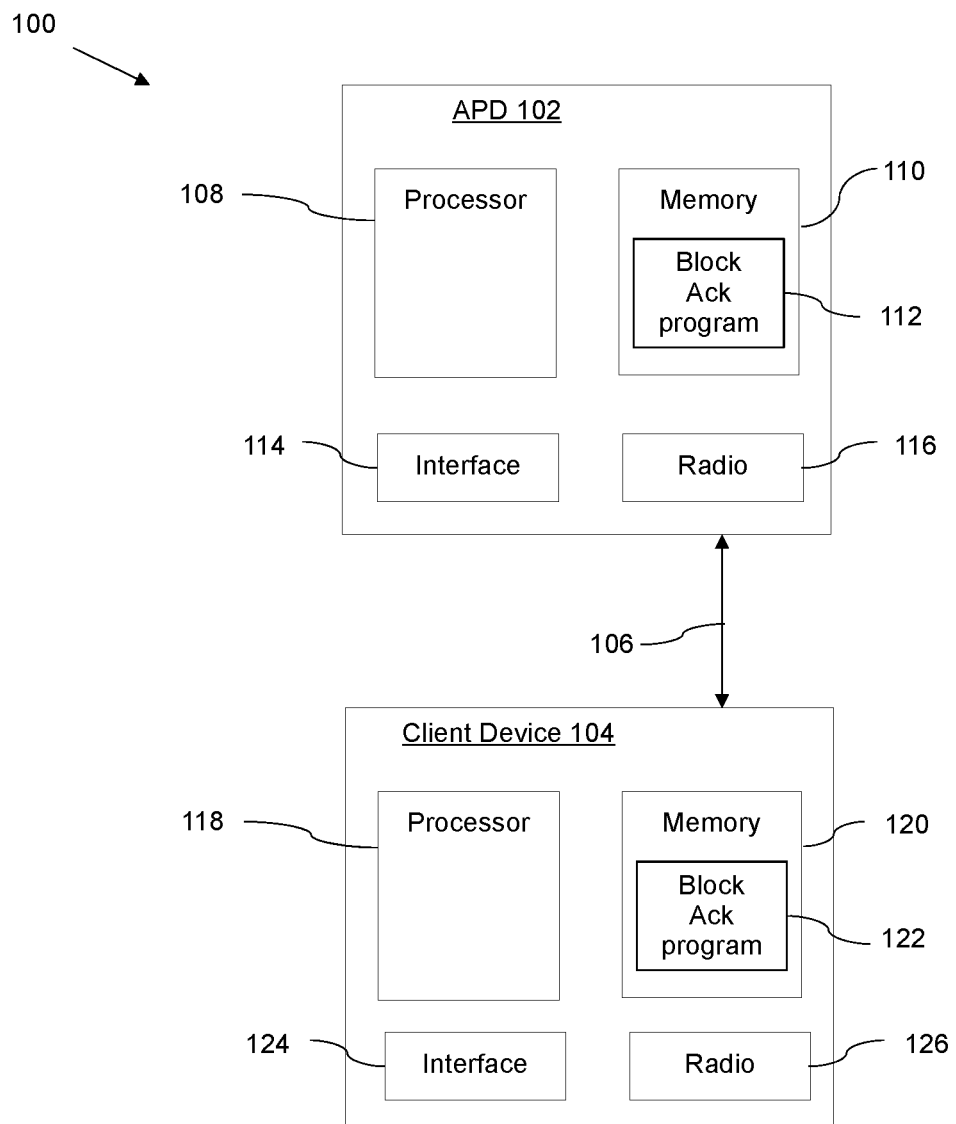
FIG. 1 illustrates an APD communicating with a client device over a wireless channel in accordance with aspects of the present disclosure.

FIG. 1 illustrates a communication system 100 in accordance with aspects of the present disclosure.

As shown in the figure, communication system 100 includes an APD 102, a client device 104 and a wireless channel 106. APD 102 and client device 104 are arranged to communicate with one another over wireless channel 106.

APD 102 includes a processor 108, a memory 110 having a Block Ack program 112 stored therein, an interface circuit 114 and at least one radio, a sample of which is indicated as a radio 116.

An APD, such as APD 102, is a networking hardware device that allows other Wi-Fi devices to connect to a Wi-Fi network. A service set ID (SSID) is an identification (in IEEE 802.11) that is broadcast by access points in beacon packets to announce the presence of a network access point for the SSID. SSIDs are customizable IDs that can be zero to 32 bytes, and can be in a natural language, such as English.

In this example, processor 108, memory 110, radio 116, and interface circuit 114 are illustrated as individual devices. However, in some embodiments, at least two of processor 108, memory 110, radio 116, and interface circuit 114 may be combined as a unitary device. Whether as individual devices or as combined devices, processor 108, memory 110, radio 116, and interface circuit 114 may be implemented as any combination of an apparatus, a system, and an integrated circuit. Further, in some embodiments, at least one of processor 108, memory 110, and interface circuit 114 may be implemented as a computer having non-transitory computer-readable media for carrying or having computer-executable instructions or data structures stored thereon. Such non-transitory computer-readable recording medium refers to any computer program product, apparatus, or device, such as a magnetic disk, optical disk, solid-state storage device, memory, programmable logic devices (PLDs), DRAM, RAM, ROM, EEPROM, CD-ROM or other optical disk storage, magnetic disk storage or other magnetic storage devices, or any other medium that can be used to carry or store desired computer-readable program code in the form of instructions or data structures and that can be accessed by a general-purpose or special-purpose computer, or a general-purpose or special-purpose processor. Disk or disc, as used herein, includes compact disc (CD), laser disc, optical disc, digital versatile disc (DVD), floppy disk, and Blu-ray disc. Combinations of the above are also included within the scope of computer-readable media. For information transferred or provided over a network or another communications connection (either hardwired, wireless, or a combination of hardwired or wireless) to a computer, the computer may properly view the connection as a computer-readable medium. Thus, any such connection may be properly termed a computer-readable medium. Combinations of the above should also be included within the scope of computer-readable media.

Example tangible computer-readable media may be coupled to a processor such that the processor may read information from, and write information to the tangible computer-readable media. In the alternative, the tangible computer-readable media may be integral to the processor. The processor and the tangible computer-readable media may reside in an integrated circuit (IC), an application specific integrated circuit (ASIC), or large scale integrated circuit (LSI), system LSI, super LSI, or ultra LSI components that perform a part or all of the functions described herein. In the alternative, the processor and the tangible computer-readable media may reside as discrete components.

Example tangible computer-readable media may be also be coupled to systems, non-limiting examples of which include a computer system/server, which is operational with numerous other general purpose or special purpose computing system environments or configurations. Examples of well-known computing systems, environments, and/or configurations that may be suitable for use with computer system/server include, but are not limited to, personal computer systems, server computer systems, thin clients, thick clients, handheld or laptop devices, multiprocessor systems, microprocessor-based systems, set-top boxes, programmable consumer electronics, network PCs, minicomputer systems, mainframe computer systems, and distributed cloud computing environments that include any of the above systems or devices, and the like.

Such a computer system/server may be described in the general context of computer system-executable instructions, such as program modules, being executed by a computer system. Generally, program modules may include routines, programs, objects, components, logic, data structures, and so on that perform particular tasks or implement particular abstract data types. Further, such a computer system/server may be practiced in distributed cloud computing environments where tasks are performed by remote processing devices that are linked through a communications network. In a distributed cloud computing environment, program modules may be located in both local and remote computer system storage media including memory storage devices.

Components of an example computer system/server may include, but are not limited to, one or more processors or processing units, a system memory, and a bus that couples various system components including the system memory to the processor.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

A program/utility, having a set (at least one) of program modules, may be stored in the memory by way of example, and not limitation, as well as an operating system, one or more application programs, other program modules, and program data. Each of the operating system, one or more application programs, other program modules, and program data or some combination thereof, may include an implementation of a networking environment. The program modules generally carry out the functions and/or methodologies of various embodiments of the application as described herein.

Processor 108 may be implemented as a hardware processor such as a microprocessor, a multi-core processor, a single core processor, a field programmable gate array (FPGA), a microcontroller, an application specific integrated circuit (ASIC), a digital signal processor (DSP), or other similar processing device capable of executing any type of instructions, algorithms, or software for controlling the operation and functions of APD 102 in accordance with the embodiments described in the present disclosure.

Memory 110 can store various programming, and user content, and data including Block Ack program 112. As will be discussed in more detail below, Block Ack program 112 may include instructions to be executed by processor 108 to cause APD 102 to: create a request including an extension element including a reserved field including a bit identifying a capability supported by the APD, and transmit the request to client device 104.

In some embodiments, as will be discussed in more detail below, Block Ack program 112 may include instruction to be executed by processor 108 to additionally cause APD 102 to: create the request as a ADDBA request frame to establish a Block Ack session, the reserved field being within an ADDBA capabilities field; and receive, from client device 104, a Block Ack frame having Block Ack header and a Block Ack payload, wherein a value associated with a capability of client device 104 resides in a BA information field of the Block Ack payload.

In some embodiments, as will be discussed in more detail below, the capability is a received channel power reporting capability and the Block Ack program 112 may include instruction to be executed by processor 108 to additionally cause APD 102 to obtain, as the value and from the BA information field of the Block Ack payload, a received channel power indicator, indicative of radio frequency power received on wireless channel 106 by client device 104.

In some embodiments, as will be discussed in more detail below, the capability is a received signal to noise reporting capability and the Block Ack program 112 may include instruction to be executed by processor 108 to additionally cause APD 102 to obtain, as the value and from the BA information field of the Block Ack payload, a received signal-to-noise indicator, indicative of noise received on wireless channel 106 by client device 104.

In some embodiments, as will be discussed in more detail below, Block Ack program 112 may include instruction to be executed by processor 108 to additionally cause APD 102 to: create the request to include the extension element to include the reserved field to include a plurality bits, each identifying a respective capability supported by the APD, wherein plural values associated with plural capabilities, respectively, of client device 104 reside in the BA information field of the Block Ack payload.

In some embodiments, as will be discussed in more detail below, the capabilities are a received channel power reporting capability and a received signal-to-noise reporting capability and the Block Ack program 112 may include instruction to be executed by processor 108 to additionally cause APD 102 to: obtain, as the values, a received channel power indicator, indicative of radio frequency power received on wireless channel 106 by client device 104, and a received signal-to-noise indicator, indicative of noise received on a channel by client device 104; and add the received channel power indicator and the received signal-to-noise indicator as the values into the BA information field of the Block Ack payload.

Interface circuit 114 can include one or more connectors, such as RF connectors, or Ethernet connectors, and/or wireless communication circuitry, such as 5G circuitry and one or more antennas. Interface circuit 114 receives content from a content provider (not shown) by known methods, non-limiting examples of which include terrestrial antenna, satellite dish, wired cable, DSL, optical fibers, or 5G as discussed above. Through interface circuit 114, gateway device APD may receive an input signal, including data and/or audio/video content, from the content provider and can send data to a content provider.

Radio 116, (and preferably two or more radios), may also be referred to as a wireless communication circuit, such as a Wi-Fi WLAN interface radio transceiver, and is operable to communicate with client device 104 via wireless channel 106. Radio 116 includes one or more antennas and communicates wirelessly via one or more of the 2.4 GHz band, the 5 GHz band, and the 6 GHz band, or at the appropriate band and bandwidth to implement any IEEE 802.11 Wi-Fi protocols, such as the Wi-Fi 4, 5, 6, or 6E protocols. APD 102 can also be equipped with a radio transceiver/wireless communication circuit to implement a wireless connection in accordance with any Bluetooth protocols, Bluetooth Low Energy (BLE), or other short range protocols that operate in accordance with a wireless technology standard for exchanging data over short distances using any licensed or unlicensed band such as the CBRS band, 2.4 GHz bands, 5 GHz bands, or 6 GHz bands, RF4CE protocol, ZigBee protocol, Z-Wave protocol, or IEEE 802.15.4 protocol.

Client device 104 may be any device or method connecting to wireless channel 106. In this non-limiting example, client device 104 may be a personal computer, a smart phone, a tablet, an Internet-enabled TV, or a video game console. Client device 104 includes a processor 118, a memory 120 having Block Ack program 122 stored therein, an interface circuit 124 and at least one radio, a sample of which is indicated as a radio 126.

In this example, processor 118, memory 120, radio 126, and interface circuit 124 are illustrated as individual devices. However, in some embodiments, at least two of processor 118, memory 120, radio 126, and interface circuit 124 may be combined as a unitary device. Whether as individual devices or as combined devices, processor 118, memory 120, radio 126, and interface circuit 124 may be implemented as any combination of an apparatus, a system, and an integrated circuit. Further, in some embodiments, at least one of processor 118, memory 120, and interface circuit 124 may be implemented as a computer having non-transitory computer-readable media for carrying or having computer-executable instructions or data structures stored thereon.

Processor 118 may be implemented as a hardware processor such as a microprocessor, a multi-core processor, a single core processor, a field programmable gate array (FPGA), a microcontroller, an application specific integrated circuit (ASIC), a digital signal processor (DSP), or other similar processing device capable of executing any type of instructions, algorithms, or software for controlling the operation and functions of client device 104 in accordance with the embodiments described in the present disclosure.

Memory 120 can store various programming, and user content, and data including Block Ack program 122. As will be discussed in more detail below, Block Ack program 122 may include instructions to be executed by processor 118 to cause client device 104 to: obtain a value associated with a capability of client device 104; create a response including a header and a payload, the header including a reserved field including a bit reporting that the payload of the response includes the value associated with the capability; and transmit the response to APD 102.

In some embodiments, as will be discussed in more detail below, Block Ack program 122 may include instructions to be executed by processor 118 to additionally cause client device 104 to: receive an ADDBA request frame from APD 102 as a Wi-Fi access point device to establish a Block Ack session, the ADDBA request frame having a reserved field within an ADDBA capabilities field, the reserved field having stored therein data indicating that the APD 102 supports the capability; determine the capability of client device 104 based on the ADDBA request frame; create an ADDBA response including a ADDBA response header including a ADDBA response reserved field having stored therein data indicating that client device 104 supports the capability; and transmit the ADDBA response to APD 102.

In some embodiments, as will be discussed in more detail below, Block Ack program 122 may include instructions to be executed by processor 118 to additionally cause client device 104 to: receive data frames from APD 102 in response to the transmission of the ADDBA response, wherein the value is additionally associated with at least one of the receipt of the ADDBA request frame and the receipt of the data frames, wherein the created response comprises a Block Ack frame having Block Ack header as the header and having a Block Ack payload as the payload, and wherein the value associated with the capability resides in a BA information field of the Block Ack payload.

In some embodiments, as will be discussed in more detail below, the capability is a received channel power reporting capability and Block Ack program 122 may include instructions to be executed by processor 118 to additionally cause client device 104 to: obtain, as the value, a received channel power indicator, indicative of radio frequency power received on wireless channel 106 by client device 104, and add the received channel power indicator as the value into the BA information field of the Block Ack payload.

In some embodiments, as will be discussed in more detail below, the capability is a received signal to noise reporting capability and Block Ack program 122 may include instructions to be executed by processor 118 to additionally cause client device 104 to: obtain, as the value, a received signal-to-noise indicator, indicative of noise received on wireless channel 106 by client device 104, and add the received signal-to-noise indicator as the value into the BA information field of the Block Ack payload.

In some embodiments, as will be discussed in more detail below, Block Ack program 122 may include instructions to be executed by processor 118 to additionally cause client device 104 to: determine that client device 104 includes plural capabilities; obtain values associated with each of the capabilities, respectively; and create the Block Ack frame such that the reserved field includes a respective bit corresponding to each of the plural capabilities, each respective bit reporting that the payload of the Block Ack frame includes the respective value associated with the respective capability, and such values associated with each of the capabilities resides in the BA information field of the Block Ack frame.

In some embodiments, as will be discussed in more detail below, the capabilities are a received channel power reporting capability and a received signal-to-noise reporting capability and Block Ack program 122 may include instruction to be executed by processor 118 to additionally cause client device 104 to: obtain, as the values, a received channel power indicator, indicative of radio frequency power received on wireless channel 106 by client device 104, and a received signal-to-noise indicator, indicative of noise received on wireless channel 106 by client device 104; and add the received channel power indicator and the received signal-to-noise indicator as the values into the BA information field of the Block Ack payload.

Interface circuit 124 can include one or more connectors, such as RF connectors, or Ethernet connectors, and/or wireless communication circuitry, such as 5G circuitry and one or more antennas. Interface circuit 124 enables a user (not shown) to interface with processor 118.

Radio 126, (and preferably two or more radios), may also be referred to as a wireless communication circuit, such as a Wi-Fi WLAN interface radio transceiver, and is operable to communicate with APD 102 via wireless channel 106. Radio 126 includes one or more antennas and communicates wirelessly via one or more of the 2.4 GHz band, the 5 GHz band, and the 6 GHz band, or at the appropriate band and bandwidth to implement any IEEE 802.11 Wi-Fi protocols, such as the Wi-Fi 4, 5, 6, or 6E protocols. Client device 104 can also be equipped with a radio transceiver/wireless communication circuit to implement a wireless connection in accordance with any Bluetooth protocols, Bluetooth Low Energy (BLE), or other short range protocols that operate in accordance with a wireless technology standard for exchanging data over short distances using any licensed or unlicensed band such as the CBRS band, 2.4 GHz bands, 5 GHz bands, or 6 GHz bands, RF4CE protocol, ZigBee protocol, Z-Wave protocol, or IEEE 802.15.4 protocol.

In operation, APD 102 communicates with client device 104 over wireless channel 106. Transmission conditions of wireless channel 106 may change over time. In one non-limiting example, client device 104 may move to a different location. In another non-limiting example, switching on a home electrical appliance may increase noise on wireless channel 106. It is useful for APD 102 to have knowledge of the channel conditions under which client device 104 is receiving data. APD 102 may use this knowledge to modify its transmission methods.

Conventional methods for client device 104 to report channel conditions to APD 102 commonly rely on sending specialized frames requesting and responding with channel condition measurements. A limitation of these methods is that they may have large overheads or may interrupt the transmission of important data.

FIG. 1 illustrates APD 102 communicating with client device 104 over wireless channel 106 in accordance with aspects of the present disclosure. Aspects of data transmission between APD 102 and client device 104 over wireless channel 106 will now be discussed with reference to FIG. 2.

Figure 2:
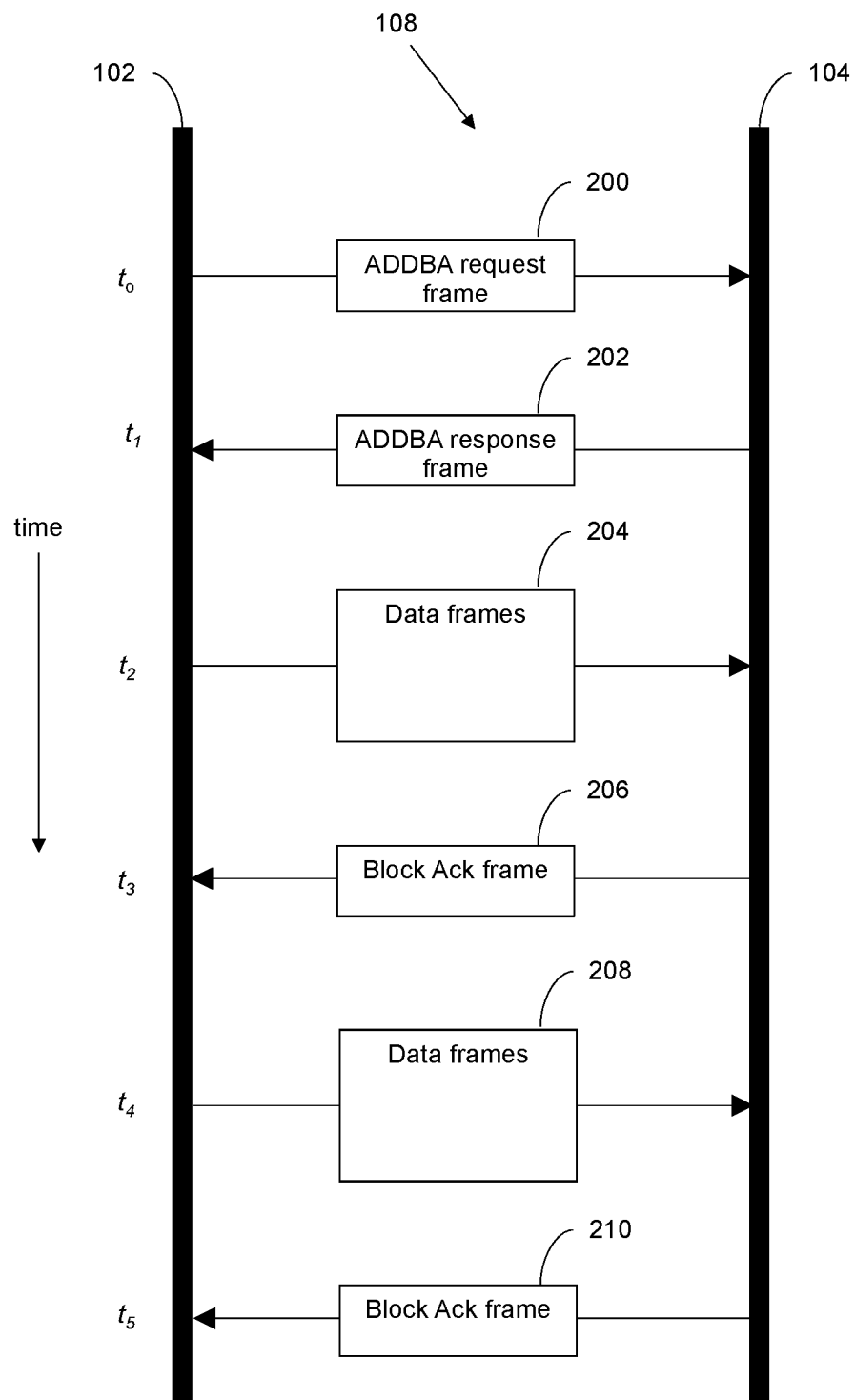
FIG. 2 illustrates a sequence of data transmissions between the APD and the client device in accordance with aspects of the present disclosure.

FIG. 2 illustrates a sequence of data transmissions between APD 102 and client device 104 over wireless channel 106 in accordance with aspects of the present disclosure.

As shown in the figure, at time $t_0$, APD 102 transmits ADDBA request frame 200 over wireless channel 106 to client device 104. At time $t_1$, client device 104 transmits ADDBA response frame 202 over wireless channel 106 to APD 102. At time $t_2$, APD 102 transmits one or more data frames 204 over wireless channel 106 to client device 104. At time $t_3$, client device 104 transmits Block Ack frame 206 over wireless channel 106 to APD 102. At time $t_4$, APD 102 transmits one or more data frames 208 over wireless channel 106 to client device 104. At time $t_5$, client device 104 transmits Block Ack frame 210 over wireless channel 106 to APD 102.

ADDBA request frame 200 interrogates whether client device 104 can support one or more capabilities. ADDBA response frame 202 is used to report whether client device 104 supports the capabilities specified by ADDBA request frame 200. When performing block data transfers, ADDBA request frame 200 and ADDBA response frame 202 are used to configure block data transfer protocols between client device 104 and APD 102.

In this non-limiting example, ADDBA request frame 200 is used to determine whether client device 104 can support other capabilities such as the reporting of channel power measurements. In another non-limiting example, ADDBA request frame 200 is used to determine whether client device 104 can support the reporting of signal-to-noise measurements. In this non-limiting example, ADDBA response frame 202 is used to report the capabilities specified by ADDBA request frame 200.

Data frames 204 and 208 are one or more communications frames that carry any kind of information. In this non-limiting example, data frames 204 and 208 carry streaming video data.

Block Ack frames 206 and 210 are used to acknowledge that client device 104 has received data frames 204 and 208, respectively. When performing block data transfers, Block Ack frames 206 and 210 include acknowledgement information such as the number of frames received and identifiers for missing frames. Other types of information may also be included in Block Ack frames 206 and 210, as will be discussed in further detail below.

In operation, APD 102 determines whether client device 104 can support block data transfers using ADDBA request frame 200. Client device 104 responds to APD 102 using ADDBA response frame 202. APD 102 transmits data frames 204. Client device 104 acknowledges the receipt of data frames 204 by transmitting Block Ack frame 206. APD 102 then transmits data frames 208. Client device 104 acknowledges the receipt of data frames 208 by transmitting Block Ack frame 210. This method allows the transfer of large blocks of data without interruption, as opposed to the method of sending an acknowledgement for each individual data frame that is received. Aspects of ADDBA request frame 200 and ADDBA response frame 202 will now be discussed with reference to FIG. 3.

Figure 3:
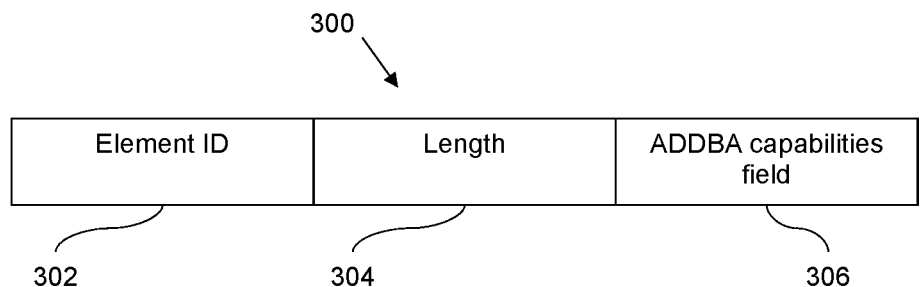
FIG. 3 illustrates elements of ADDBA request and response frames in accordance with aspects of the present disclosure.

FIG. 3 illustrates elements of ADDBA request frame 200 and ADDBA response frame 202 in accordance with aspects of the present disclosure.

ADDBA request frame 200 and ADDBA response frame 202 include many sets of information. As shown in the figure, one set of information is ADDBA extension element 300. ADDBA extension element 300 includes element ID 302, length 304, and ADDBA capabilities field 306. Element ID 302 describes the type of element. ADDBA capabilities field 306 enumerates the capabilities of the device being interrogated. Length 304 specifies the length of ADDBA capabilities field 306.

In this non-limiting example embodiment, ADDBA capabilities field 306 specifies whether client device 104 is capable of reporting channel power measurements. In another non-limiting example embodiment, ADDBA capabilities field 306 specifies whether client device 104 is capable of reporting signal-to-noise measurements.

ADDBA request frame 200 is used to query the capabilities of client device 104 and ADDBA response frame 202 is used to indicate the capabilities of client device 104. When a capability is supported, client device 104 can report back values associated with this capability by adding these values into Block Ack frames 206 and 210. Aspects of Block Ack frames 206 and 210 will now be discussed with reference to FIG. 4.

Figure 4:
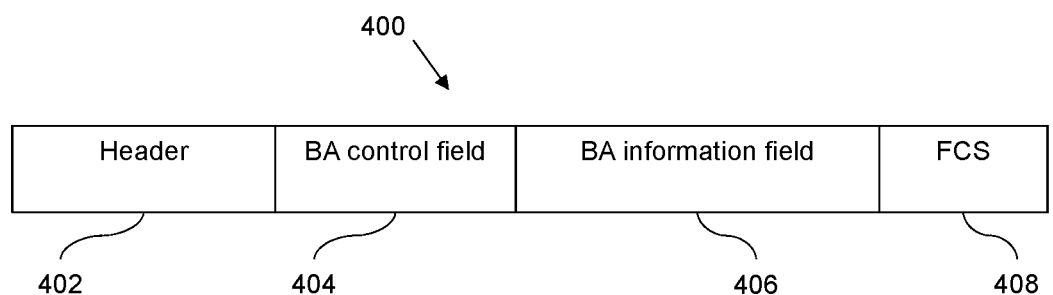
FIG. 4 illustrates elements of a Block Ack frame in accordance with aspects of the present disclosure.

FIG. 4 illustrates elements of Block Ack frame 400 in accordance with aspects of the present disclosure As shown in the figure, Block Ack frame 400 includes header 402, Block Ack control field 404, Block Ack information field 406, and FCS 408. In this non-limiting example, Block Ack frame 400 is formatted according to 802.11 standards. Block Ack frames 206 and 210 are example embodiments of Block Ack frame 400.

Header 402 includes a preamble, a source device address, and a destination device address. FCS 408 contains frame check sequence information that aids detection of corrupted data in Block Ack frame 400.

Block Ack control field 404 indicates whether specific information is being carried by Block Ack frame 400. The specific information itself is included in Block Ack information field 406.

Referring to FIG. 2, client device 104 reports one or more supported capabilities using ADDBA response frame 202. Between block transfers of data frames 204 and 208, client device 104 returns values associated with these capabilities by adding those values to Block Ack frames 206 and 210. In this non-limiting example, client device 104 supports reporting of channel power and signal-to-noise measurements. Those measurement values are added to Block Ack frames 206 and 210. Since Block Ack frames 206 and 210 are already used in the normal process of block data transfers, adding the measurement values imposes little overhead and does not interrupt the communication of information.

In this non-limiting embodiment, channel condition measurements are reported using Block Ack frame 206 at time $t_3$ and Block Ack frame 210 at time $t_5$. If client device 104 physically changes locations between time $t_3$ and time $t_5$, changes in channel condition measurements are reported to APD 102. In another non-limiting embodiment, client device 104 may have multiple antennas. Block Ack frame 206 and Block Ack frame 210 can be used to report variances in channel condition measurements between multiple antennas.

FIGS. 1-4 illustrate client device 104 communicating channel condition measurements to APD 102 during the course of block data transfers. An algorithm to be executed by a processor for determining capabilities of client device 104 will now be discussed with reference to FIG. 5.

Figure 5:
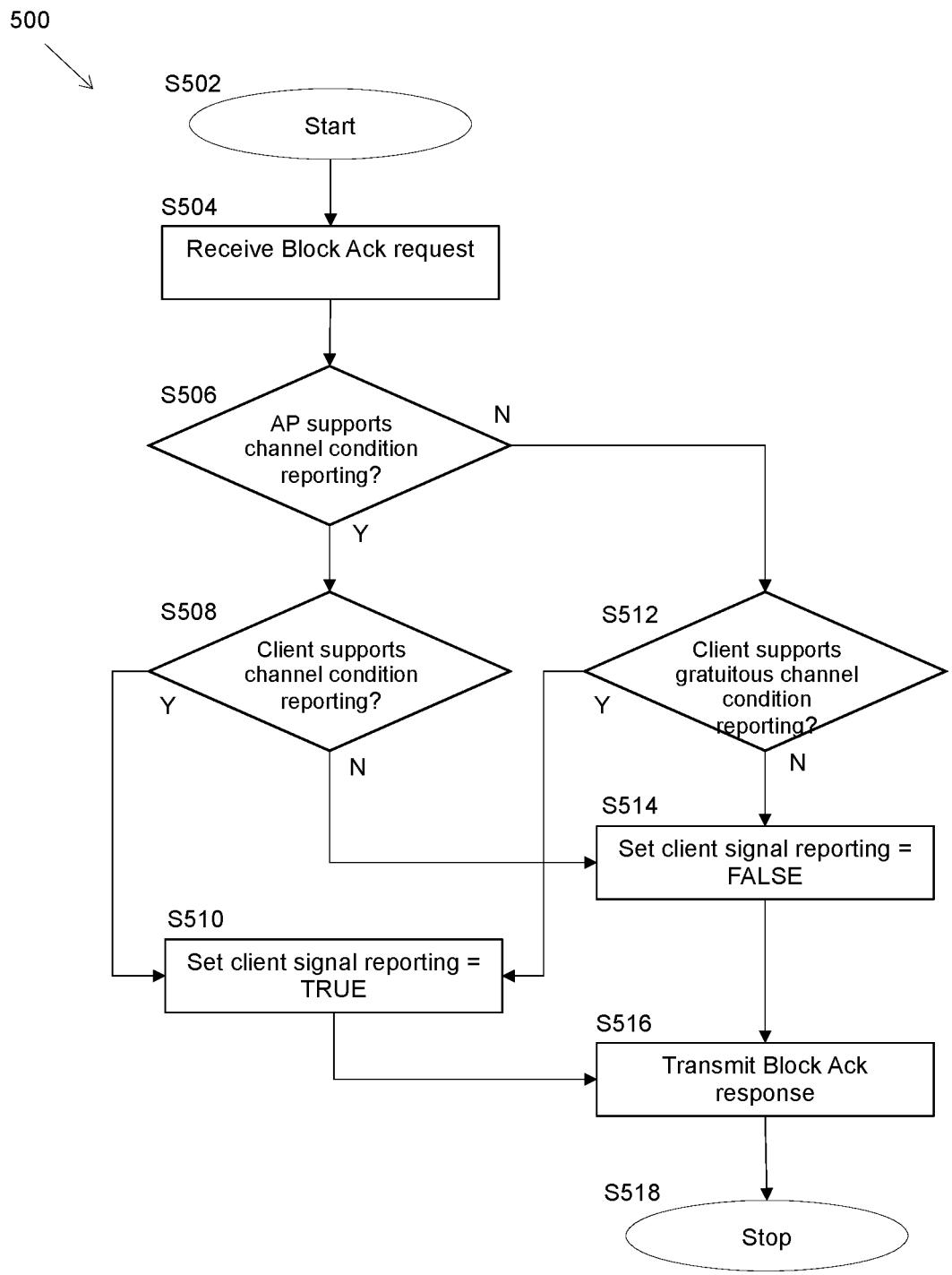
FIG. 5 illustrates a method of determining capabilities of the APD and the client device in accordance with aspects of the present disclosure.

FIG. 5 illustrates an algorithm 500 for determining capabilities of the APD and the client device in accordance with aspects of the present disclosure.

As shown in the figure, algorithm 500 starts (S502) and a Block Ack request frame is received (S504). For example, referring to FIG. 2, ADDBA request frame 200 is received from APD 102 by client device 104.

As shown in FIG. 1, processor 108, of APD 102, creates request frame 200 and instructs radio 116 to transmit request frame 200 to client device 104 via wireless channel 106. Radio 126, of client device 104, receives request frame 200 from APD 102 and provides request frame 200 to processor 118.

Returning to FIG. 5, it is determined whether the APD supports channel conditions reporting (S506). For example, referring to FIG. 1, processor 108 uses Block Ack program 112 to determine whether APD 102 is capable of receiving and utilizing channel condition measurements.

Returning to FIG. 5, if it is determined that the APD supports channel conditions reporting (Y on S506), then it is determined whether the client device supports channel conditions reporting (S508). For example, referring to FIG. 1, processor 118 uses Block Ack program 112 to determine whether client device 104 is capable of reporting channel condition measurements. Client device 104 then informs APD 102 whether client device 104 is capable of reporting channel condition measurements.

Returning to FIG. 5, if it is determined that the client device supports channel conditions reporting (Y on S508), then a client signal reporting flag in a Block Ack response frame is set to TRUE (S510). For example, as shown in FIG. 2, ADDBA response frame 202 from client device 104 to APD 102 includes a bit that may be toggled to indicate that client device 104 supports channel conditions reporting.

Returning to FIG. 5, if it is determined that the client device does not support channel conditions reporting (N on S508), then the client signal reporting flag is set to FALSE (S514). For example, as shown in FIG. 2, ADDBA response frame 202 from client device 104 to APD 102 includes a bit that may be toggled to indicate that client device 104 does not support channel conditions reporting.

Returning to FIG. 5, after the client signal reporting flag is set to TRUE (S510) or is set to FALSE (S514), the Block Ack response frame is then transmitted (S516). For example, referring to FIG. 1, processor 118 uses Block Ack program 122 to determine whether client device 104 is capable of reporting channel condition measurements. Referring to FIG. 2, processor 118 uses Block Ack program 122 to modify the appropriate flag in ADDBA response frame 202 and transmits ADDBA response frame 202 to APD 102.

Returning to FIG. 5, if it is determined that that the APD does not support channel conditions reporting (N on S506), then it is further determined whether the client device supports gratuitous signal reporting (S512). In this non-limiting embodiment, gratuitous signal reporting allows client device 104 to transmit channel condition measurements even though APD 102 ignores those measurements. Referring to FIG. 1, processor 118 uses Block Ack program 122 to determine whether client device 104 is capable of reporting channel condition measurements.

Returning to FIG. 5, if it is determined that the client device supports gratuitous channel conditions reporting (Y on S512), then a client signal reporting flag in a Block Ack response frame is set to TRUE as discussed above (S510). If it is determined that the client device does not support gratuitous channel conditions reporting (N on S512), then the client signal reporting flag is set to FALSE as discussed above (S514).

After the client signal reporting flag is set to TRUE (S510), or is set to FALSE (S514), the Block Ack response frame is then transmitted (S516). For example, referring to FIG. 1, processor 118 uses Block Ack program 122 to determine whether client device 104 is capable of reporting channel condition measurements. Referring to FIG. 2, processor uses Block Ack program 122 to modify the appropriate flag in ADDBA response frame 202 and transmit ADDBA response frame 202 to APD 102.

Returning to FIG. 5, after the Block Ack response frame is transmitted (S516), algorithm 500 then stops (S518).

FIG. 5 describes algorithm 500 of determining channel condition reporting capabilities of APD 102 and client device 104. In particular, algorithm 500 is drawn to the operation of client device 104 at time $t_1$, in response to receiving an ADDBA request frame 200 at time to, as shown in FIG. 2. Subsequently, after receiving data frames from APD 102, at time $t_2$, as shown in FIG. 2, client device 104 will reply with a Block Ack frame 206 at time $t_3$, which may report channel conditions for wireless channel 106 as perceived by client device 104. An algorithm to be executed by a processor for reporting channel conditions will now be discussed with reference to FIG. 6.

Figure 6:
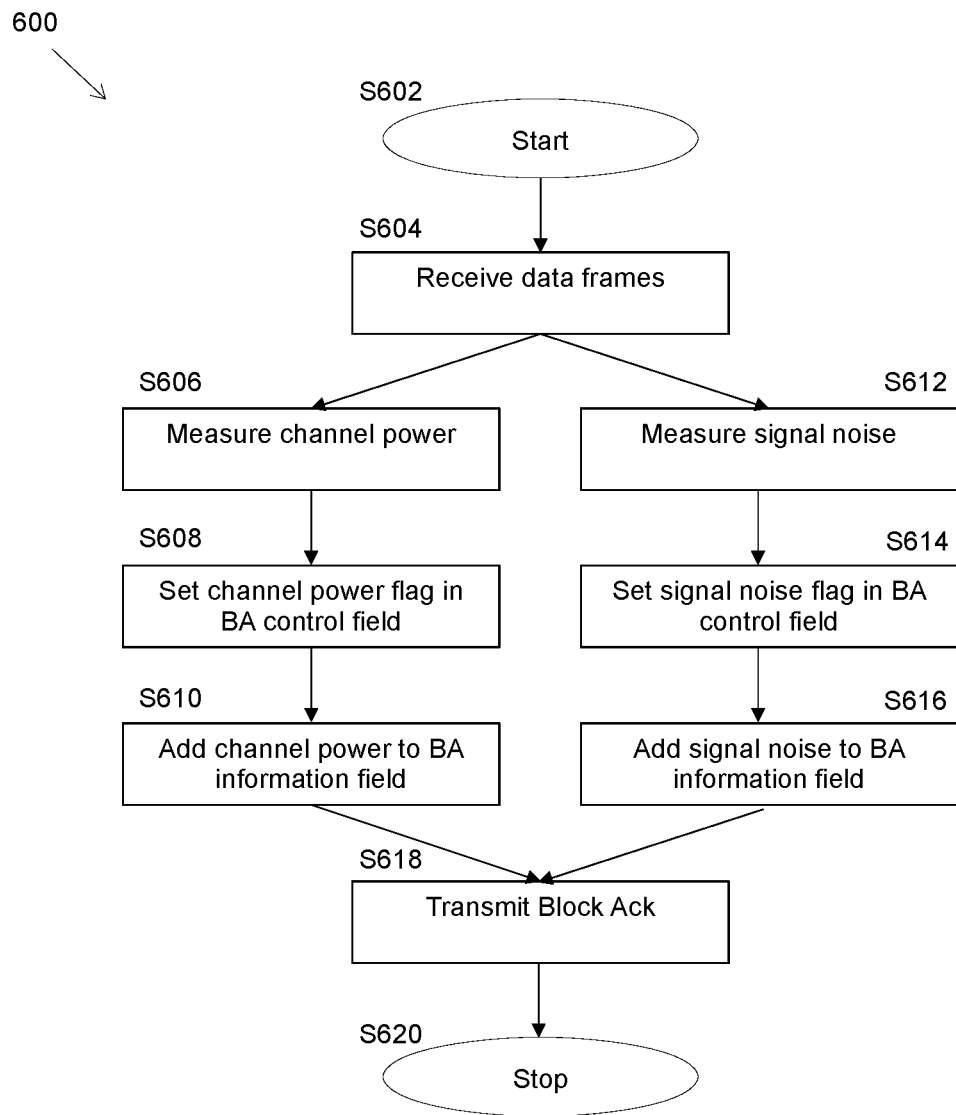
FIG. 6 illustrates a method of reporting channel conditions in accordance with aspects of the present disclosure.

FIG. 6 illustrates an algorithm 600 to be executed by a processor for reporting channel conditions in accordance with aspects of the present disclosure.

As shown in the figure, algorithm 600 starts (S602) and data frames are received (S604). Referring to FIG. 2, client device 104 receives data frames 204 from APD 102 over wireless channel 106.

Returning to FIG. 6, after data frames are received (S604), a value of at least one capability is determined. In a non-limiting example embodiment, one capability includes measuring channel power of wireless channel 106 as measured by client device 104 and another capability includes measuring signal-to-noise of a signal received by client device 104 from APD 102 over wireless channel 106. For purposes of discussion only, in this example, channel power is measured (S606) and signal-to-noise is measured (S612).

For example, as shown in FIG. 2, APD 102 transmits data frames 204 to client device 104 at time $t_2$. As shown in FIG.

1, processor 118 is able to determine channel power and a signal-to-noise ratio based on the data frames from APD 102 as received by radio 126.

Returning to FIG. 6, after the channel power is measured (S606), the channel power flag is set in the Block Ack control field (S608) to indicate the presence of channel power measurements. For example, as shown in FIG. 4, a bit corresponding to the channel power flag in BA control field 404 is toggled to TRUE. Similarly, after the signal-to-noise ratio is measured (S612), the signal-to-noise flag is set in the Block Ack control field (S614) to indicate the presence of signal-to-noise measurements. For example, as shown in FIG. 4, a bit corresponding to the signal-to-noise ratio flag in BA control field 404 is toggled to TRUE.

Returning to FIG. 6, after the channel power flag is set in the Block Ack control field (S608) and after the signal-to-noise flag is set in the Block Ack control field (S614), channel power and signal-to-noise measurements are added to the Block Ack information field (S610 and S616). For example, referring to FIG. 1, processor 118 uses Block Ack program 122 to direct client device 104 to measure channel power and signal-to-noise for data frames 204. Processor 118 uses Block Ack program 122 to add the measurements and control flags to Block Ack frame 206.

Returning to FIG. 6, the Block Ack frame containing channel condition measurements is transmitted (S618) and algorithm 600 stops (S620). For example, referring to FIG. 2, client device 104 transmits Block Ack frame 206 containing channel condition measurements to APD 102 over wireless channel 106. Client device 104 can then wait for the next block data transfer.

Accordingly, client device 104 transmits a Block Ack frame to APD 102 periodically, in a manner similar to that of conventional Wi-Fi network communications. However, in accordance with the present disclosure, the Block Ack frame includes information related to parameters associated with client device 104. In the non-limiting example discussed above with reference to FIG. 6, the parameters associated with client device 104 are the channel power associated with the power of wireless channel 106 as perceived by client device 104 and the signal-to-noise ratio of wireless channel 106 as perceived by client device 104 from APD 102.

In summary, an APD may be connected to a client device over a wireless channel for communications purposes. It is useful for the client device to report channel conditions of its received data back to the APD. Conventional methods for reporting channel conditions often require requests and responses of specialized frames, which adds overhead and can interrupt the transmission of information.

The present disclosure presents a system and method of reporting channel conditions by a client device to an APD by adding channel condition measurements to Block Ack frames. Since Block Ack frames are already used in block data transfer processes, adding channel condition measurements presents little additional overhead and does not interrupt the transmission of information.

The operations disclosed herein may constitute algorithms that can be effected by software, applications (apps, or mobile apps), or computer programs. The software, applications, and computer programs can be stored on a non-transitory computer-readable medium for causing a computer, such as the one or more processors, to execute the operations described herein and shown in the drawing figures.

The foregoing description of various preferred embodiments have been presented for purposes of illustration and description. It is not intended to be exhaustive or to limit the present disclosure to the precise forms disclosed, and obviously many modifications and variations are possible in light of the above teaching. The example embodiments, as described above, were chosen and described in order to best explain the principles of the present disclosure and its practical application to thereby enable others skilled in the art to best utilize the present disclosure in various embodiments and with various modifications as are suited to the particular use contemplated. It is intended that the scope of the present disclosure be defined by the claims appended hereto.

What is claimed is:

1. A client device for use with an access point device, said client device comprising:
   a memory; and
   a processor configured to execute instructions stored on said memory to cause said client device to:
      obtain a value associated with a capability of said client device;
      receive an Add Block Ack (ADDBA) request frame from the access point device as a Wi-Fi access point device to establish a Block Ack session, the ADDBA request frame having a reserved field within an ADDBA capabilities field, the reserved field having stored therein data indicating that the Wi-Fi access point device supports the capability;
      determine the capability of said client device based on the ADDBA request frame;
      create an ADDBA response including an ADDBA response header including an ADDBA response reserved field having stored therein data indicating that the client device supports the capability; and
      transmit the ADDBA response to the access point device.

2. The client device of claim 1, wherein the processor is further configured to execute instructions stored on said memory to additionally cause said client device to:
   create a response including a header and a payload, the header including the reserved field including a bit reporting that the payload of the response includes the value associated with the capability; and
   transmit the response to the access point device.

3. The client device of claim 2, wherein the processor is further configured to execute instructions stored on said memory to additionally cause said client device to:
   receive data frames from the Wi-Fi access point device in response to the transmission of the ADDBA response,
   wherein the value is additionally associated with at least one of the receipt of the ADDBA request frame and the receipt of the data frames,
   wherein the created response comprises a Block Ack frame having Block Ack header as the header and having a Block Ack payload as the payload, and
   wherein the value associated with the capability resides in a Block Ack (BA) information field of the Block Ack payload.

4. The client device of claim 3, wherein
   the capability is a received channel power reporting capability, and
   the processor is further configured to execute instructions stored on said memory to cause said client device to:
      obtain, as the value, a received channel power indicator, indicative of radio frequency power received on a channel by said client device, and add the received channel power indicator as the value into the BA information field of the Block Ack payload.

5. The client device of claim 3, wherein
the capability is a received signal to noise reporting capability, and
the processor is further configured to execute instructions stored on said memory to cause said client device to:
obtain, as the value, a received signal-to-noise indicator, indicative of noise received on a channel by said client device, and
add the received signal-to-noise indicator as the value into the BA information field of the Block Ack payload.

6. A method of using a client device with an access point device, said method comprising:
obtaining, via a processor configured to execute instructions stored on a memory, a value associated with a capability of the client device;
receiving, via the processor, an ADDBA request frame from the access point device as a Wi-Fi access point device to establish a Block Ack session, the ADDBA request frame having a reserved field within an ADDBA capabilities field, the reserved field having stored therein data indicating that the Wi-Fi access point device supports the capability;
determining, via the processor, the capability of the client device based on the ADDBA request frame;
creating, via the processor, an ADDBA response including a ADDBA response header including a ADDBA response reserved field having stored therein data indicating that the client device supports the capability; and
transmitting, via the processor, the ADDBA response to the access point device.

7. The method of claim 6, further comprising:
creating, via the processor, a response including a header and a payload, the header including a reserved field including a bit reporting that the payload of the response includes the value associated with the capability; and
transmitting; and
transmitting, via the processor, the response to the access point device.

8. The method of claim 7, further comprising:
receiving, via the processor, data frames from the Wi-Fi access point device in response to the transmission of the ADDBA response,
wherein the value is additionally associated with at least one of the receipt of the ADDBA request frame and the receipt of the data frames,
wherein the created response comprises a Block Ack frame having Block Ack header as the header and having a Block Ack payload as the payload, and
wherein the value associated with the capability resides in a BA information field of the Block Ack payload.

9. The method of claim 8,
wherein the capability is a received channel power reporting capability, and
wherein the method further comprises:
obtaining, via the processor and as the value, a received channel power indicator, indicative of radio frequency power received on a channel by the client device, and
adding, via the processor, the received channel power indicator as the value into the BA information field of the Block Ack payload.

10. The method of claim 8, further comprising:
wherein the capability is a received signal-to-noise reporting capability, and
wherein the method further comprises:
obtaining, via the processor and as the value, a received signal-to-noise indicator, indicative of noise received on a channel by the client device, and
adding, via the processor, the received signal-to-noise indicator as the value into the BA information field of the Block Ack payload.

11. A non-transitory, computer-readable media having computer-readable instructions stored thereon, the computer-readable instructions being capable of being read by a client device for use with an access point device, wherein the computer-readable instructions are capable of instructing the client device to perform the method comprising:
obtaining, via a processor configured to execute instructions stored on a memory, a value associated with a capability of the client device,
receiving, via the processor, an ADDBA request frame from the access point device as a Wi-Fi access point device to establish a Block Ack session, the ADDBA request frame having a reserved field within an ADDBA capabilities field, the reserved field having stored therein data indicating that the Wi-Fi access point device supports the capability;
determining, via the processor, the capability of the client device based on the ADDBA request frame;
creating, via the processor, an ADDBA response including a ADDBA response header including a ADDBA response reserved field having stored therein data indicating that the client device supports the capability; and
transmitting, via the processor, the ADDBA response to the access point device.

12. The non-transitory, computer-readable media of claim 11, wherein the computer-readable instructions are capable of instructing the client device to perform the method further comprising:
creating, via the processor, a response including a header and a payload, the header including a reserved field including a bit reporting that the payload of the response includes the value associated with the capability; and
transmitting, via the processor, the response to the access point device.

13. The non-transitory, computer-readable media of claim 12, wherein the computer-readable instructions are capable of instructing the client device to perform the method further comprising:
receiving, via the processor, data frames from the Wi-Fi access point device in response to the transmission of the ADDBA response,
wherein the value is additionally associated with at least one of the receipt of the ADDBA request frame and the receipt of the data frames,
wherein the created response comprises a Block Ack frame having Block Ack header as the header and having a Block Ack payload as the payload, and
wherein the value associated with the capability resides in a BA information field of the Block Ack payload.

14. The non-transitory, computer-readable media of claim 13, wherein the computer-readable instructions are capable of instructing the client device to perform the method
wherein the capability is a received channel power reporting capability, and wherein the method further comprises:
obtaining, via the processor and as the value, a received channel power indicator, indicative of radio frequency power received on a channel by the client device, and
adding, via the processor, the received channel power indicator as the value into the BA information field of the Block Ack payload.

15. The non-transitory, computer-readable media of claim 13, wherein the computer-readable instructions are capable of instructing the client device to perform the method
wherein the capability is a received signal-to-noise reporting capability, and
wherein the method further comprises:
obtaining, via the processor and as the value, a received signal-to-noise indicator, indicative of noise received on a channel by the client device, and
adding, via the processor, the received signal-to-noise indicator as the value into the BA information field of the Block Ack payload.

16. An access point device for use with a client device, said access point device comprising:
a memory; and
a processor configured to execute instructions stored on said memory to cause said access point device to:
create a request, including an extension element including a reserved field including a bit identifying a capability supported by said access point device, as an ADDBA request frame to establish a Block Ack session, the reserved field being within an ADDBA capabilities field;
receive, from the client device, a Block Ack frame having a Block Ack header and a Block Ack payload; and
wherein a value associated with a capability of the client device resides in a BA information field of the Block Ack payload.

17. The access point device of claim 16, wherein the processor is further configured to execute instructions stored on said memory to additionally cause said access point device to:
transmit the request to the client device.

18. The access point device of claim 17, wherein
the capability is a received channel power reporting capability, and
the processor is further configured to execute instructions stored on said memory to cause said access point device to obtain, as the value and from the BA information field of the Block Ack payload, a received channel power indicator, indicative of radio frequency power received on a channel by the client device.

19. The access point device of claim 17, wherein
the capability is a received signal to noise reporting capability, and
the processor is further configured to execute instructions stored on said memory to cause said access point device to obtain, as the value and from the BA information field of the Block Ack payload, a received signal-to-noise indicator, indicative of noise received on a channel by the client device.

20. A method of using an access point device with a client device, said method comprising:
creating, via a processor configured to execute instructions stored on a memory, a request, including an extension element including a reserved field including a bit identifying a capability supported by the access point device, as an ADDBA request frame to establish a Block Ack session, the reserved field being within an ADDBA capabilities field;
receiving, from the client device, a Block Ack frame having Block Ack header and a Block Ack payload; and
wherein a value associated with a capability of the client device resides in a BA information field of the Block Ack payload.

21. The method of claim 20, further comprising:
transmitting, via the processor, the request to the client device.

22. The method of claim 21,
wherein the capability is a received channel power reporting capability, and
wherein the method further comprises:
obtaining, via the processor, as the value and from the BA information field of the Block Ack payload, a received channel power indicator, indicative of radio frequency power received on a channel by the client device.

23. The method of claim 21, further comprising:
wherein the capability is a received signal-to-noise reporting capability, and
wherein the method further comprises:
obtaining, via the processor, as the value and from the BA information field of the Block Ack payload, a received signal-to-noise indicator, indicative of noise received on a channel by the client device.

24. A non-transitory, computer-readable media having computer-readable instructions stored thereon, the computer-readable instructions being capable of being read by an access point device for use with a client device, wherein the computer-readable instructions are capable of instructing the access point device to perform the method comprising:
creating, via a processor configured to execute instructions stored on a memory, a request, including an extension element including a reserved field including a bit identifying a capability supported by the access point device, as an ADDBA request frame to establish a Block Ack session, the reserved field being within an ADDBA capabilities field;
receiving, from the client device, a Block Ack frame having Block Ack header and a Block Ack payload; and
wherein a value associated with a capability of the client device resides in a BA information field of the Block Ack payload.

25. The non-transitory, computer-readable media of claim 24, wherein the computer-readable instructions are capable of instructing the access point device to perform the method further comprising:
transmitting, via the processor, the request to the client device.

26. The non-transitory, computer-readable media of claim 25, wherein the computer-readable instructions are capable of instructing the access point device to perform the method
wherein the capability is a received channel power reporting capability, and
wherein the method further comprises:
obtaining, via the processor, as the value and from the BA information field of the Block Ack payload, a received channel power indicator, indicative of radio frequency power received on a channel by the client device.

27. The non-transitory, computer-readable media of claim 25, wherein the computer-readable instructions are capable of instructing the access point device to perform the method wherein the capability is a received signal-to-noise reporting capability, and wherein the method further comprises:

obtaining, via the processor, as the value and from the BA information field of the Block Ack payload, a received signal-to-noise indicator, indicative of noise received on a channel by the client device.

\* \* \* \* \*